United States Patent
Yang

(10) Patent No.: US 9,454,307 B2
(45) Date of Patent: Sep. 27, 2016

(54) CONTROLLER USED FOR MULTI-STORAGES, TERMINAL DEVICE AND START-UP AND ACCESS METHOD THEREOF

(75) Inventor: Liangyin Yang, Beijing (CN)

(73) Assignees: BEIJING LENOVO SOFTWARE LTD., Beijing (CN); LENOVO (BEIJING) CO., LTD., Beijing (CN)

( * ) Notice: Subject to any disclaimer, the term of this patent is extended or adjusted under 35 U.S.C. 154(b) by 139 days.

(21) Appl. No.: 13/520,777

(22) PCT Filed: Dec. 31, 2010

(86) PCT No.: PCT/CN2010/080605
§ 371 (c)(1),
(2), (4) Date: Jul. 5, 2012

(87) PCT Pub. No.: WO2011/082653
PCT Pub. Date: Jul. 14, 2011

(65) Prior Publication Data
US 2012/0284451 A1 Nov. 8, 2012

(30) Foreign Application Priority Data
Jan. 5, 2010 (CN) .......................... 2010 1 0120104

(51) Int. Cl.
*G06F 21/50* (2013.01)
*G06F 3/06* (2006.01)

(52) U.S. Cl.
CPC ........... *G06F 3/0605* (2013.01); *G06F 3/0632* (2013.01); *G06F 3/0664* (2013.01); *G06F 3/0689* (2013.01)

(58) Field of Classification Search
CPC .................. G06F 2212/2022; G06F 12/1027; G06F 11/1441; G06F 12/08; G06F 12/1009; G06F 3/0679; G06F 12/0866; G06F 2212/311; G06F 2212/651; G06F 12/145; G06F 12/0246; G06F 12/0868; G06F 17/30362; G06F 2221/2147; G06F 2221/2149; G06F 3/0617; G06F 3/0622; G06F 3/0637; G06F 3/0665; G06F 2009/45583; G06F 9/4406; G06F 12/109; G06F 17/30233; G06F 2009/45579; G06F 12/0871; G06F 9/45558; G06F 9/45533; G06F 12/1036; G06F 2212/657; G06F 12/0802; G06F 12/10; G06F 3/0689; G06F 2212/206; G06F 9/467; G06F 21/575; G06F 11/1417; G06F 21/57; G06F 9/441; G06F 2211/1083; G06F 3/0674

See application file for complete search history.

(56) References Cited

U.S. PATENT DOCUMENTS 5,301,287 A * 4/1994 Herrell ................ G06F 12/0835
345/501
5,442,763 A * 8/1995 Bartfai et al. ................ 711/145

(Continued)

FOREIGN PATENT DOCUMENTS

| CN | 1553345 | 12/2004 |
|---|---|---|
| CN | 1945537 | 4/2007 |
| CN | 101398822 | 4/2009 |

OTHER PUBLICATIONS

English Abstract of Chinese Application 1945537; 1 page.
(Continued)

*Primary Examiner* — David X Yi
*Assistant Examiner* — Candice Rankin
(74) *Attorney, Agent, or Firm* — Peter Su; Dentons US LLP

(57) ABSTRACT

A controller used for multi-storages is provided. The multi-storages include a first storage for storing the data of an operating system and at least a second storage for storing the data of user. The first storage and the second storage are formed into a virtual storage supporting the start-up of the operating system by the controller.

10 Claims, 3 Drawing Sheets

(56) References Cited

U.S. PATENT DOCUMENTS

| | | | |
|---|---|---|---|
| 5,987,565 A | 11/1999 | Gavaskar | |
| 7,818,390 B2* | 10/2010 | Zhang et al. | 709/215 |
| 8,082,411 B1* | 12/2011 | Seetharam et al. | 711/165 |
| 2002/0116590 A1* | 8/2002 | Franaszek | G06F 12/023 711/170 |
| 2004/0230963 A1* | 11/2004 | Rothman et al. | 717/168 |
| 2007/0033362 A1* | 2/2007 | Sinclair | 711/165 |
| 2007/0061558 A1* | 3/2007 | Rothman et al. | 713/1 |
| 2008/0209103 A1* | 8/2008 | Haga | G11B 5/40 711/100 |
| 2010/0031360 A1* | 2/2010 | Seshadri | G06F 21/57 726/24 |
| 2011/0173370 A1* | 7/2011 | Jacobs | G06F 12/1009 711/6 |

OTHER PUBLICATIONS

Office Action for Chinese Application No. 201010120104.8, mailed Jun. 7, 2013; 13 pages.

English Translation of Office Action for Chinese Application No. 201010120104.8; 14 pages.

English Translation of Cited Content in Office Action for Chinese Application No. 201010120104.8; 2 pages.

Chinese Patent Application No. 201010120104.8, Chinese Patent Office, Fifth Office Action mailed Dec. 3, 2013; 12 pages.

English Translation of Fifth Office Action for Chinese Patent Application No. 201010120104.8, Chinese Patent Office, Fifth Office Action mailed Dec. 3, 2013; 14 pages.

International Search Report dated Mar. 31, 2011 corresponding to PCT/CN2010/080605.

Beijing Lenovo Software Ltd.; PCT/CN2010/080605 filed Dec. 31, 2010; International Preliminary Report on Patentability; mailed Mar. 31, 2011; International Bureau of WIPO; 5 pages.

Chinese Patent Application No. 201010120104.8, Chinese Patent Office, Rejection Decision mailed May 28, 2014; 13 pages.

English Translation of Rejection Decision for Chinese Patent Application No. 201010120104.8, Chinese Patent Office, Fifth Office Action mailed May 28, 2014; 18 pages.

* cited by examiner

CONTROLLER USED FOR MULTI-STORAGES, TERMINAL DEVICE AND START-UP AND ACCESS METHOD THEREOF

CROSS REFERENCE TO RELATED APPLICATIONS

This application is a national phase application based on international application number PCT/CN2010/080605, filed Dec. 31, 2010, and claims priority of Chinese Patent Application No. 201010120104.8, filed Jan. 5, 2010, the contents of both of which are incorporated by reference herein in their entireties.

TECHNICAL FIELD

The present invention relates to a controller used for multi-storages, a mobile device, a start-up and an access method for the mobile device.

BACKGROUND

Several recent dynamic magnetic disk technologies allow the incorporation of multiple physical magnetic disks or storage mediums into a single virtual storage. However, a physical magnetic disk for storing data of system and a physical magnetic disk for storing user data are not allowed to be incorporated into a single virtual storage, due to a limitation in the operating system such as Windows®. If a user enforces the physical magnetic disk for storing data of system and the physical magnetic disk for storing data of user being incorporated into the single virtual storage using a dynamic magnetic disk technology, the operating system would recognize that the virtual storage is actually composed of the physical magnetic disk for storing data of system and the physical magnetic disk for storing data of user during a start-up process, which would cause a case that a blue screen is displayed because the operating system crashes. Thus, the operating system is unable to operate, which affects the usage of a user.

SUMMARY

The present invention provides a controller, a mobile device, and a start-up and access method for the mobile device, which allows incorporating a physical magnetic disc for storing data of system and a physical magnetic disc for storing data of user into a single virtual storage.

According to an aspect of the present invention, there is provided a controller for multi-storages including a first storage for storing data of an operating system and at least a second storage for storing data of user, wherein the controller forms the first storage and the second storage as a virtual storage supporting start-up of the operating system.

Wherein the controller converts attribute information of the first storage and attribute information of the second storage(s) into attribute information of the virtual storage and stores the same in the first storage, when the operating system starts-up.

Further, the controller shields accessing to the second storage before the converting, and converting the attribute information comprises: converting at least one of an address of the first storage and an address of the second storage; and making the address of the first storage and the address of the second storage are continuous after the converting.

Further, when an access request to the virtue storage is received, the controller judges whether the access request is an access request to the second storage, and if the access request is the access request to the second storage, the controller converts the access request into the access request to the second storage.

Further, the controller parses the access request to the virtue storage and judges whether a target address of the access request is within an address range of the first storage, and if the target address of the access request is not within the address range of the first storage, the controller judges that the access request is the access request to the second storage.

Further, the first storage is a Solid State Disk and the second storage is a Hard Drive Disk.

According to another aspect of the present invention, there is provided a terminal device comprising: multi-storages including a first storage for storing data of an operating system and at least a second storage for storing data of user; a file system module for forming files in a predetermined structure; a volume manager for performing a volume label management on the files; a partition manager for managing partitions in the multi-storages; and a controller, wherein the controller forms the first storage and the second storage as a virtual storage supporting start-up of the operating system.

According to a further aspect of the present invention, there is provided a start-up method for a terminal device, the terminal device comprises: multi-storages including a first storage for storing data of an operating system and at least a second storage for storing data of user; a file system module for forming files in a predetermined structure; a volume manager for performing a volume label management on the files; a partition manager for managing partitions in the multi-storages; and a controller for forming the first storage and the second storage as a virtual storage supporting start-up of the operating system, wherein the start-up method comprises: converting attribute information of the first storage and attribute information of the second storage(s) into attribute information of the virtual storage and storing the same in the first storage.

Wherein the start-up method further comprises shielding accessing to the second storage before the converting, and converting the attribute information comprises: converting at least one of an address of the first storage and an address of the second storage; and making the address of the first storage and the address of the second storage are continuous after the converting.

According to a still aspect of the present invention, there is provided an accessing method for a terminal device, the terminal device comprises: multi-storages including a first storage for storing data of an operating system and at least a second storage for storing data of user; a file system module for forming files in a predetermined structure; a volume manager for performing a volume label management on the files; a partition manager for managing partitions in the multi-storages; and a controller for forming the first storage and the second storage as a virtual storage supporting start-up of the operating system, wherein the accessing method comprises: when an access request to the virtue storage is received, judging whether the access request is an access request to the second storage, and if the access request is the access request to the second storage, converting the access request into the access request to the second storage.

The accessing method further comprises: parsing the access request to the virtue storage and judging whether a target address of the access request is within an address range of the first storage; and if the target address of the access request is not within the address range of the first storage, judging that the access request is the access request to the second storage.

DETAILED DESCRIPTION

In order to make the above objects, features and advantages of the present invention being more apparent, particular implementations of the present invention will be described in details in connection with drawings.

Figure 1:
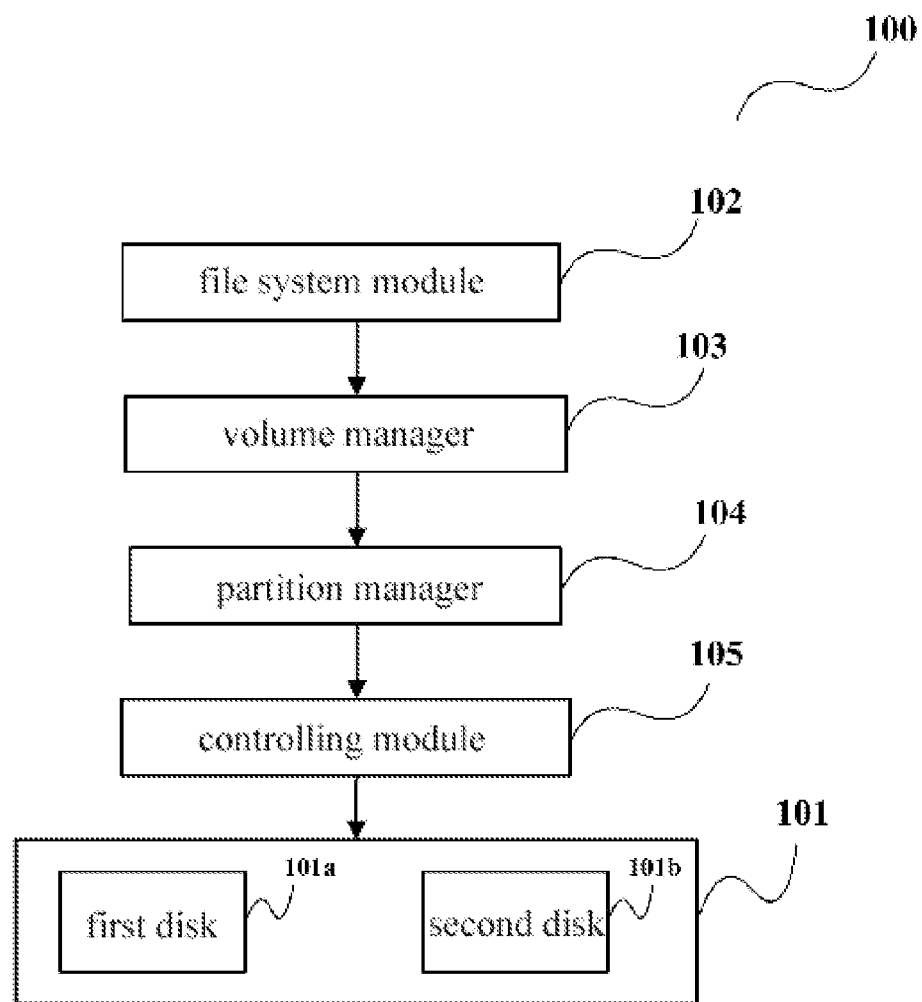
FIG. 1 is a diagram illustrating a functional configuration of a terminal device according to an embodiment of the present invention.

FIG. 1 is a diagram illustrating a functional configuration of a terminal device according to an embodiment of the present invention. As illustrated in FIG. 1, a terminal device 100 according to the embodiment of the present invention comprises a plurality of magnetic disks (including a first disk 101a and a second disk 101b), a file system module 102, a volume manager 103, a partition manager 104, a controlling module 105, an input-output interface (not shown), and a display unit (not shown), etc. Since functions, structures and operations of the units not shown in the figure do not involve any improvements to the prior art, their detailed descriptions will be omitted herein.

In the terminal device 100 according to the embodiment of the present invention, the first disk 101a is used for storing data of an operating system, the second disk 101b is used for storing data of user; the controlling module 105 is used for forming the first disk 101a and the second disk 101b as a virtual storage supporting start-up of the operating system; the partition manager 104 is used for managing partitions in the virtual storage including the first disk 101a and the second disk 101b; the volume manager 103 is used for performing a volume label management on partitions in the virtual storage so as to provide a user with a volume semantic (that is, a disk drive letter); the file system module 102 is used for defining a file structure (such as NTFS and FAT32) for respective volumes so as to be able to form files in a predetermined structure.

Below a detail description will be given to a process of a virtual magnetic disk management during a start-up process in the terminal device according to the embodiment of the present invention.

Figure 2:
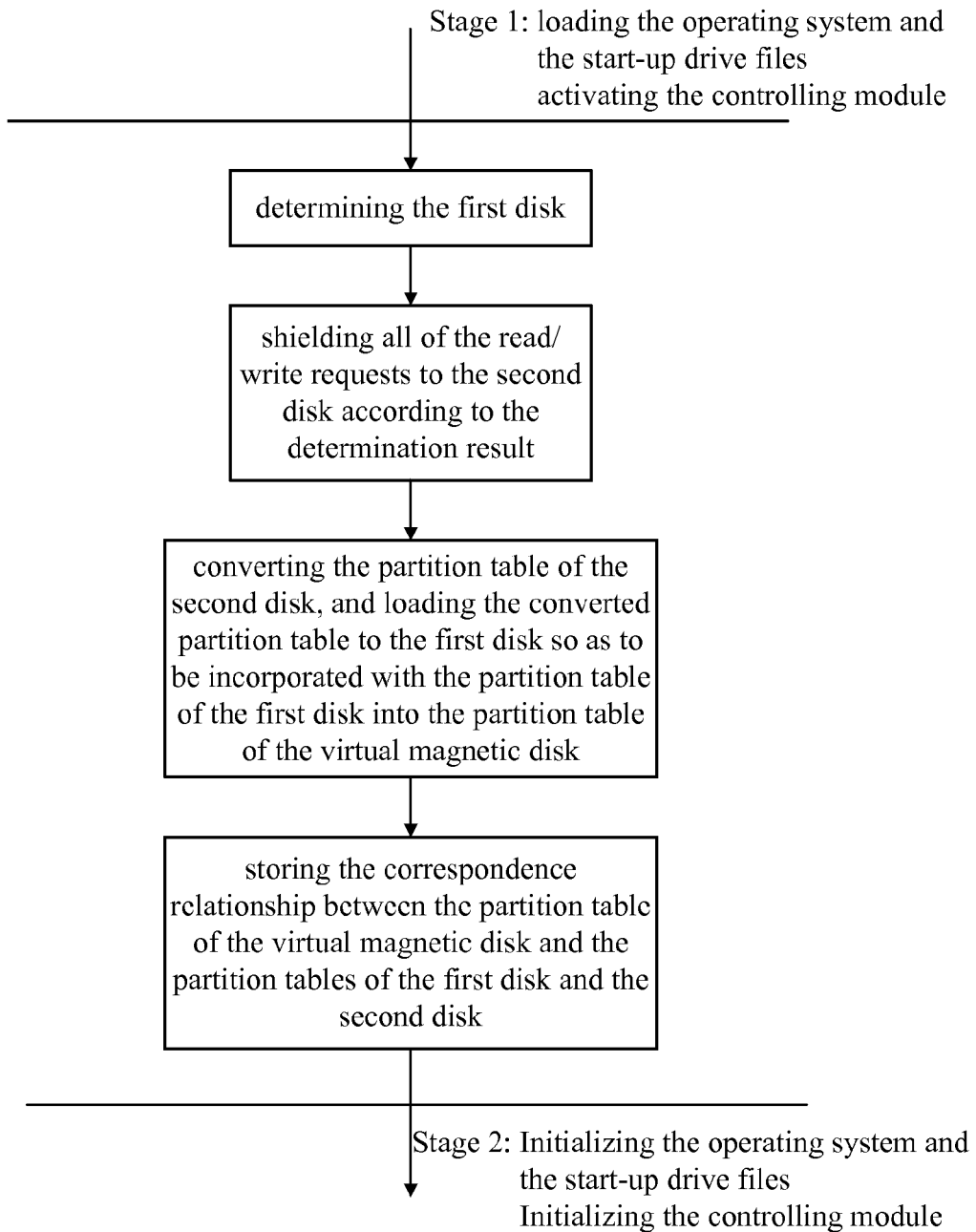
FIG. 2 is a flowchart illustrating a virtual magnetic disk management during a start-up process in the terminal device according to the embodiment of the present invention in details.

FIG. 2 is a flowchart illustrating the virtual magnetic disk management during a start-up process in the terminal device according to the embodiment of the present invention in details.

When the terminal device 100 starts-up, the operating system and start-up driving files are loaded and the controlling module 105 is activated. In a initialization stage of the operating system and the start-up driving files, the controlling module 105 also performs a corresponding initialization process so as to shield the second disk 101b for the operating system of the terminal device 100 by the initialization process. In particular, the initialization process determines which one of the disks is the first disk 101a for storing the data of system at first; then shields all of read/write request to the second disk 101b according to the determination result, so that the operating system of the terminal device 100 fails to identify a partition information on the second disk 101b and in turn can not load any partitions on the second disk 101b; at last, converts a partition table of the second disk 101b and load the converted partition table to the first disk 101a so as to be incorporated with a partition table of the first disk 101a into a partition table of the virtual magnetic disk, so that spatial addresses in the virtual magnetic disk are continuous entirely. Next, the controlling module 105 stores a correspondence relationship between the partition table of the virtual magnetic disk and the partition tables of the first disk 101a and the second disk 101b.

The first disk 101a and the second disk 101b form one single virtual magnetic disk through the above initialization process, because the spatial addresses in the virtual magnetic disk are continuous. Further, with the above-described configuration, the controlling module 105 shields all of the read/write accesses to the second disk 101b, and the partition table of the second disk 101b is incorporated with the partition table of the first disk 101a to form the partition table of the virtual magnetic disk, therefore the operating system of the terminal device 100 only can access the first disk 101a and obtains the partition table of the virtual magnetic disk. In this case, the operating system only can identify the first disk 101a, and considers the first disk 101a as a disk having a capacity equal to a sum of the capacity of the first disk 101a and the capacity of the second disk 101b according to the virtual partition table obtained from the first disk 101a. Accordingly, the operating system of the terminal device 100 can not recognize that the virtual magnetic disk is composed of the first disk 101a for storing the system data of the operating system and the second disk 101b for storing the data of user, so that a phenomenon that a blue screen is displayed when the operating system crashes would not occur.

Below a detail description will be given to a process of a virtual magnetic disk management during an accessing process in the terminal device according to the embodiment of the present invention.

Figure 3:
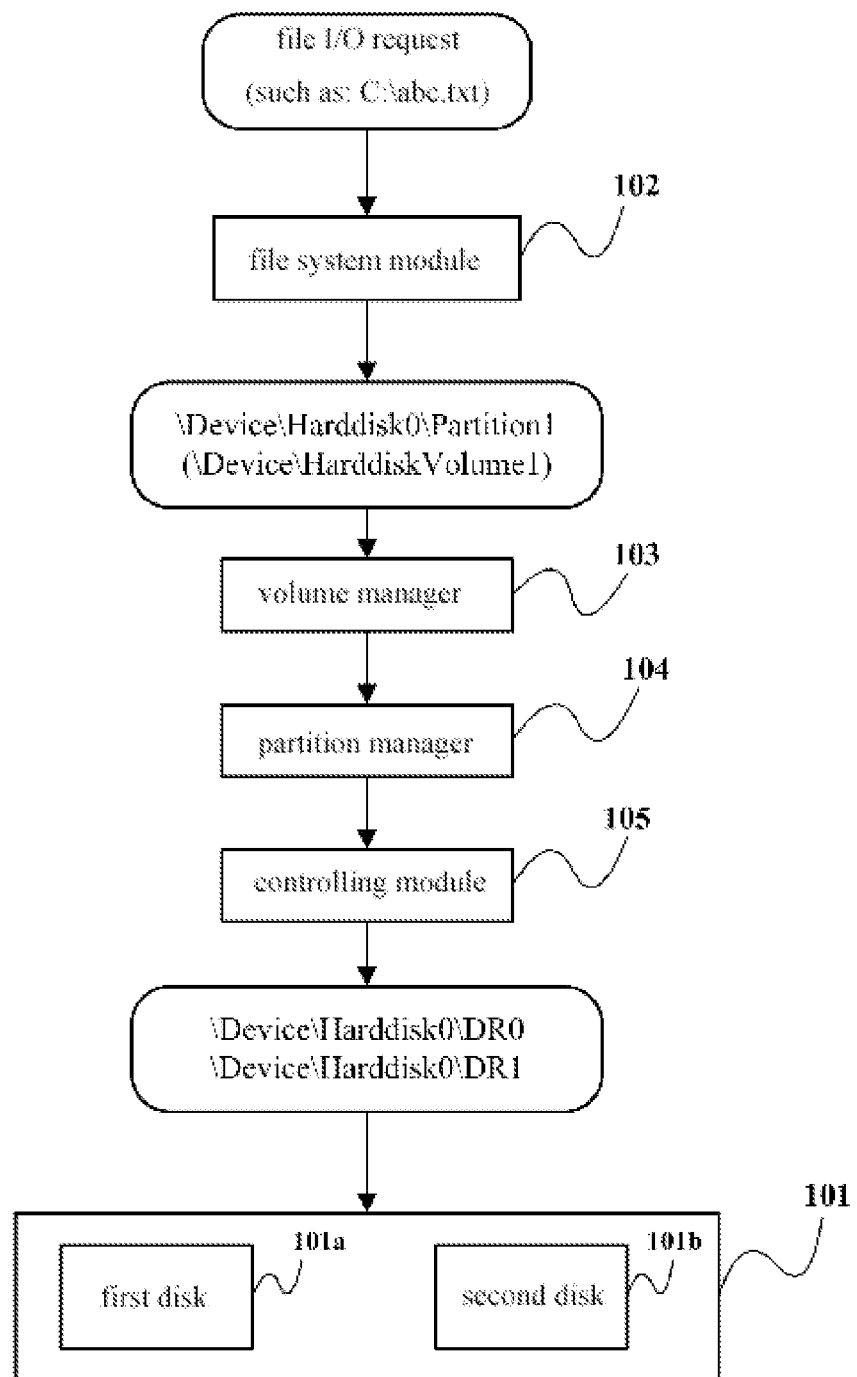
FIG. 3 is a flowchart illustrating a virtual magnetic disk management during an accessing process in the terminal device according to the embodiment of the present invention in details.

FIG. 3 is a flowchart illustrating a virtual magnetic disk management during an accessing process in the terminal device according to the embodiment of the present invention in details.

When the user calls a file, the operating system of the terminal device 100 generates a file I/O (input/output) request.

Next, at Step S111, the file system module 102 performs a volume-based I/O in a sector level according to the file I/O request, and generates a volume-based I/O request and sends it to the volume manager 103.

At Step S112, the volume manager 103 receives the volume-based I/O request from the file system module 102, performs a disk-based I/O in the sector level, generates a disk-based I/O request and sends it to the partition manager 104.

At Step S113, the partition manager 104 receives the disk-based I/O request from the volume manager 103, and forwards the received disk-based I/O request to the controlling module 105.

At Step S114, the controlling module 105 receives the I/O request from the partition manager 104, parses the I/O request and judges whether a target address (virtual address) in the parsed I/O request is within an address range of the first disk 101*a* based on the target address and a correspondence relationship between a partition table of the virtual magnetic disk and partition tables of the first disk and the second disk.

When the target address of the I/O request is within the address range of the first disk 101*a*, the target address in the I/O request is used directly without being converted.

When the target address of the I/O request is not within the address range of the first disk 101*a*, the access request is determined as an access request to the second disk 101*b*. Then, an auxiliary I/O request is created based on the target address in the parsed I/O request and the correspondence relationship between the partition table of the virtual magnetic disk and the partition tables of the first disk and the second disk. The target address of the auxiliary I/O request points to an actual physical address in the second disk 101*b*, so that the actual address in different disks (the first disk 101*a* and the second disk 101*b*) can be accessed based on the target address (virtual address).

Further, according to one embodiment of the present invention, a Solid State Disk (SSD) may be selected as the first disk for storing the data of system, and a Hard Drive Disk (HDD) may be selected as the second disk for storing the data of user. An access speed of the SSD is obviously higher than the access speed of the HDD, and a price of the SSD is also obviously higher than the HDD. Under a control of the controlling module 105 in the embodiment of the present invention, the high-speed SSD having a small capacity is used as the first disk for storing the data of system and the HDD having a large capacity is used as the second disk for storing the data of user, a running speed of the operating system in the terminal device 100 may be raised efficiently, and a cost of the large capacity virtual magnetic disk including the first disk and the second disk may be well controlled.

Further, the terminal device according to the embodiment of the present invention may comprise a plurality of second disks so as to provide a larger storage capacity.

Further, in the above-described embodiment of the present invention, the partition table of the second disk 101*b* is converted and loaded to the first disk 101*a* so as to form the virtual partition table. Alternatively, however, the partition tables of the first disk 101*a* and the second disk 101*b* may be reallocated (such as, converted) arbitrarily as long as the generated virtual partition table is continuous.

Further, according to the above-described embodiment of the present invention, the data of user is stored in the second disk 101*b* and the data of system is stored in the first disk 101*a*. However, the present invention is not limited thereto, and the data of system and the data of user may be stored at arbitrary positions in the first disk 101*a* and the second disk 101*b*, respectively.

Further, in the above-described embodiment of the present invention, the present invention is described by using the magnetic disk as a storage. However, the present invention is not limited hereto, and any nonvolatile storage, such as the magnetic disk, flash memory and so on, may be used as the storage device of the terminal device in the embodiment of the present invention.

The embodiment of the present invention may be applied to the terminal device such as a notebook computer, a personal computer, a server, and the like.

The above are only exemplary embodiments of the disclosed solution, but the scope sought for protection is not limited thereto. Instead, any or all modifications, combinations, sub-combinations and replacements as would be obvious to those skilled in the art are intended to be included within the scope of the present invention. Therefore, the scope of the present invention is defined in the appended claims.

What is claimed is:

1. A controller for multi-storages, comprising:
    a first physical storage for storing data of an operating system; and
    at least a second physical storage for storing data of a user, wherein,
        the controller converts a partition table of the second physical storage and loads the converted partition table to the first physical storage so as to form a partition table of a virtual storage supporting start-up of the operating system, stores a correspondence relationship between the partition table of the virtual storage and the partition tables of the first physical storage and the second physical storage, and
        when the operating system starts-up, the controller shields direct access to the second physical storage so that the operating system can not recognize the second physical storage, and indirectly accesses the second physical storage by converting virtual address of the virtual storage into address of the first physical storage and address of the second physical storage based on the correspondence relationship.

2. The controller of claim 1, wherein
    the converting of the address comprises making the address of the first physical storage and the address of the second physical storage continuous.

3. The controller of claim 1, wherein when an access request to the virtual storage is received, the controller judges whether the access request is an access request to the second physical storage, and if the access request is the access request to the second physical storage, the controller converts the access request into the access request to the second physical storage based on the correspondence relationship.

4. The controller of claim 3, wherein the controller parses the access request to the virtual storage and judges whether a target address of the access request is within an address range of the first physical storage, and if the target address of the access request is not within the address range of the first physical storage, the controller determines that the access request is the access request to the second physical storage.

5. The controller according to claim 1, wherein the first physical storage is a solid state disk and the second physical storage is a hard drive disk.

6. A terminal device, comprising:
    multi-storages including a first physical storage for storing data of an operating system and at least a second physical storage for storing data of a user;
    a file system module for forming files in a predetermined structure;
    a volume manager for performing a volume label management on the files;
    a partition manager for managing partitions in the multi-storages; and
    a controller that converts a partition table of the second physical storage and loads the converted partition table to the first physical storage so as to form a partition table of a virtual storage supporting start-up of the operating system, stores a correspondence relationship between partition table of the virtual storage and partition tables of the first physical storage and the second physical storage, wherein,
when the operating system starts-up, the controller shields direct access to the second physical storage so that the operating system can not recognize the second physical storage, and then indirectly accesses the second physical storage by converting virtual address of the virtual storage into address of the first physical storage and address of the second physical storage based on the correspondence relationship.

7. A start-up method for a terminal device, wherein the start-up method is applied to the terminal device, the terminal device comprising: multi-storages including a first physical storage for storing data of an operating system and at least a second physical storage for storing data of a user; a file system module for forming files in a predetermined structure; a volume manager for performing a volume label management on the files; a partition manager for managing partitions in the multi-storages; and a controller that converts a partition table of the second physical storage and loads the converted partition table to the first physical storage so as to form a partition table of a virtual storage supporting start-up of the operating system, and stores a correspondence relationship between partition table of the virtual storage and partition tables of the first physical storage and the second physical storage, wherein the start-up method comprises:
shielding direct access to the second physical storage so that the operating system can not recognize the second physical storage; and
after the shielding of the access to the second physical storage, indirectly accessing the second physical storage by converting virtual address of the virtual storage into address of the first physical storage and address of the second physical storage based on the correspondence relationship.

8. The start-up method as claimed in claim 7, wherein the converting of the address comprises:
making the address of the first physical storage and the address of the second physical storage continuous.

9. An accessing method for a terminal device, wherein the accessing method is applied to the terminal device, the terminal device comprising: multi-storages including a first physical storage for storing data of an operating system and at least a second physical storage for storing data of user; a file system module for forming files in a predetermined structure; a volume manager for performing a volume label management on the files; a partition manager for managing partitions in the multi-storages; and a controller that forms converts a partition table of the second physical storage and loads the converted partition table to the first physical storage so as to form a partition table of a virtual storage supporting start-up of the operating system and stores a correspondence relationship between partition table of the virtual storage and partition tables of the first physical storage and the second physical storage, wherein the accessing method comprises:
when an access request to the virtual storage is received, judging whether the access request is an access request to the second physical storage;
if the access request is the access request to the second physical storage, converting the access request into the access request to the second physical storage based on the correspondence relationship; and
when the operating system starts-up, shielding direct access to the second physical storage so that the operating system can not recognize the second physical storage and then indirectly accessing the second physical storage by converting virtual address of the virtual storage into address of the first physical storage and address of the second physical storage based on the correspondence relationship.

10. The accessing method as claimed in claim 9, wherein the accessing method further comprises:
parsing the access request to the virtual storage and judging whether a target address of the access request is within an address range of the first physical storage; and
if the target address of the access request is not within the address range of the first physical storage, judging that the access request is the access request to the second physical storage.

* * * * *